May 7, 1935.  F. E. M. SCHENK  2,000,298
TRAVELING CHAIN GRATE
Filed April 2, 1931  7 Sheets-Sheet 1
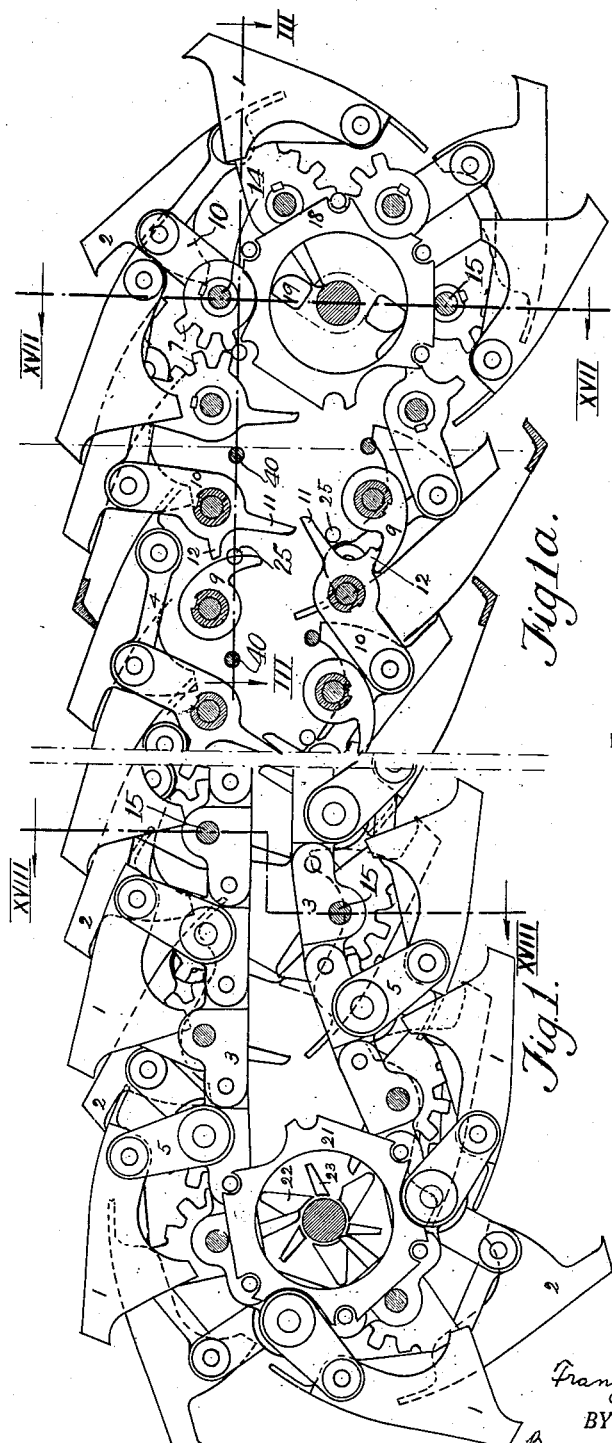
INVENTOR.
Franz E. M. Schenk
BY
Byrnes, Stebbins, Parmelee & Blenko
ATTORNEYS.

May 7, 1935.　　　F. E. M. SCHENK　　　2,000,298
TRAVELING CHAIN GRATE
Filed April 2, 1931　　　7 Sheets-Sheet 2
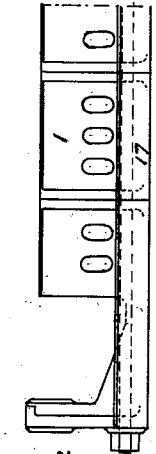
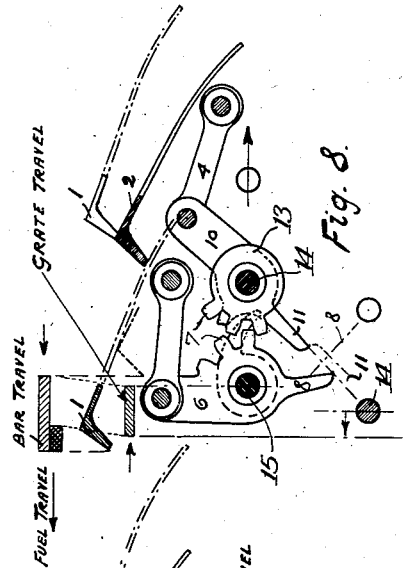
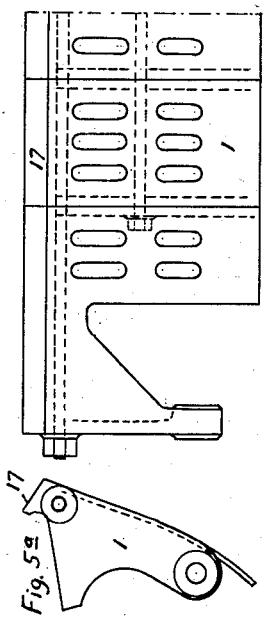
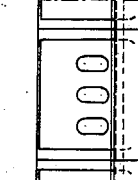
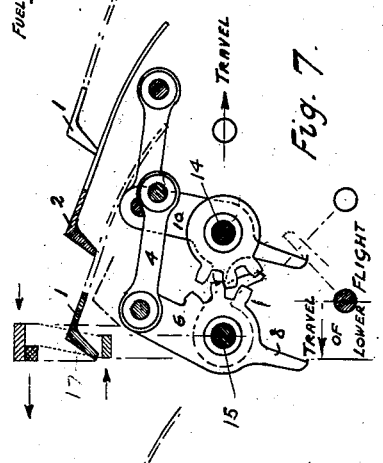
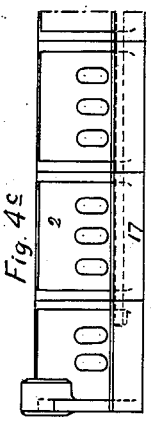
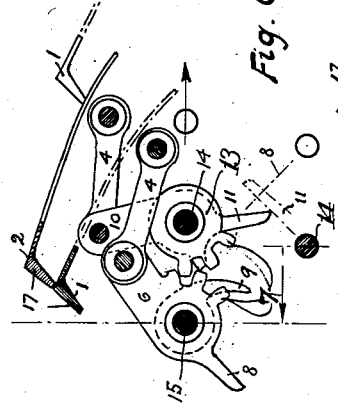
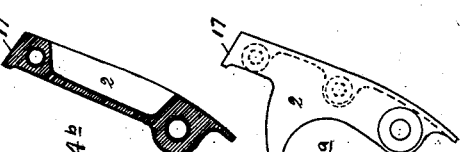
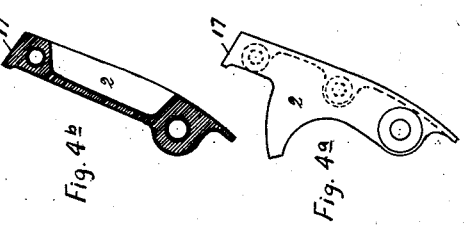
INVENTOR.
Franz E. M. Schenk
BY
Byrnes, Stebbins, Parmelee & Blenko
ATTORNEYS.

May 7, 1935.  F. E. M. SCHENK  2,000,298

TRAVELING CHAIN GRATE

Filed April 2, 1931  7 Sheets-Sheet 3

INVENTOR.
Franz E. M. Schenck.
BY
Byrnes, Stebbins, Parmelee & Blenko
ATTORNEYS

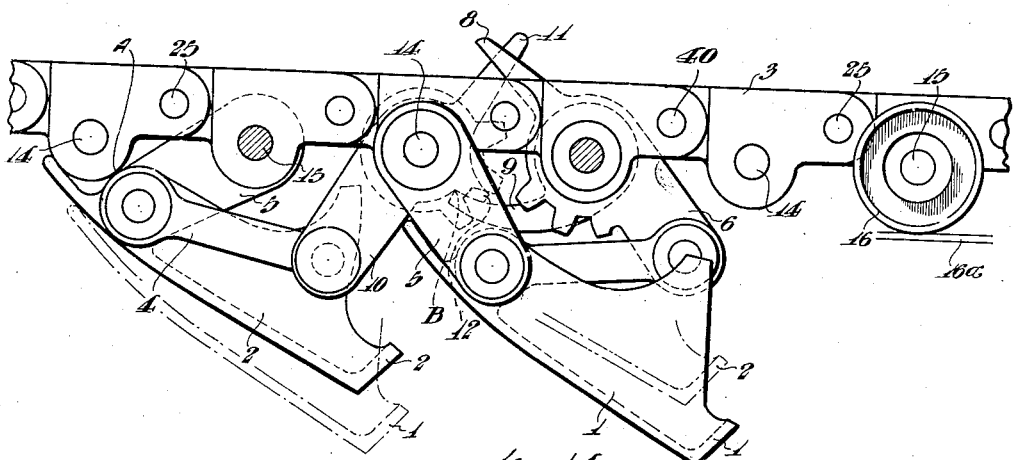
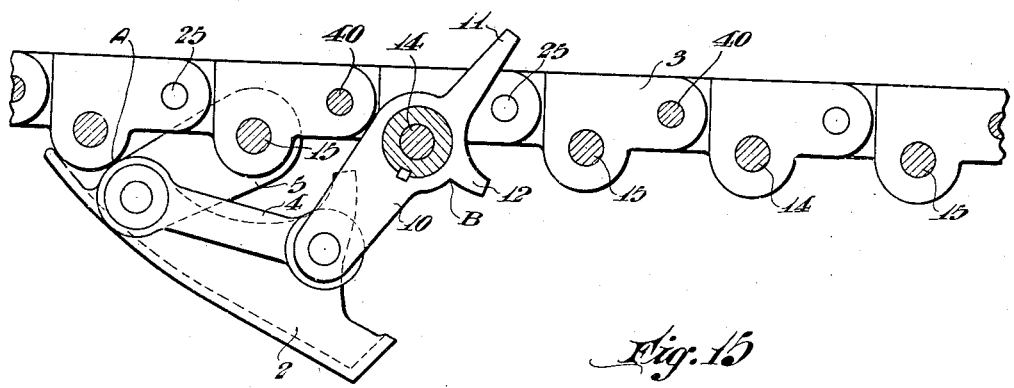
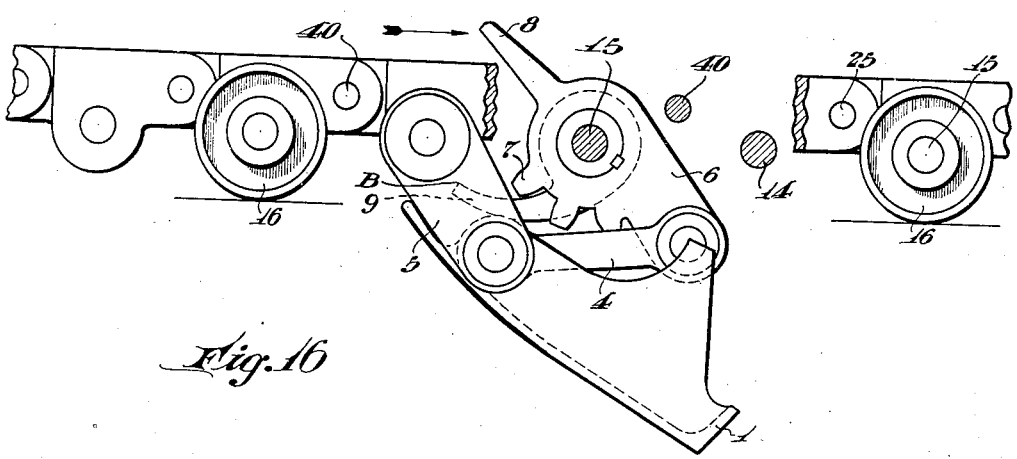

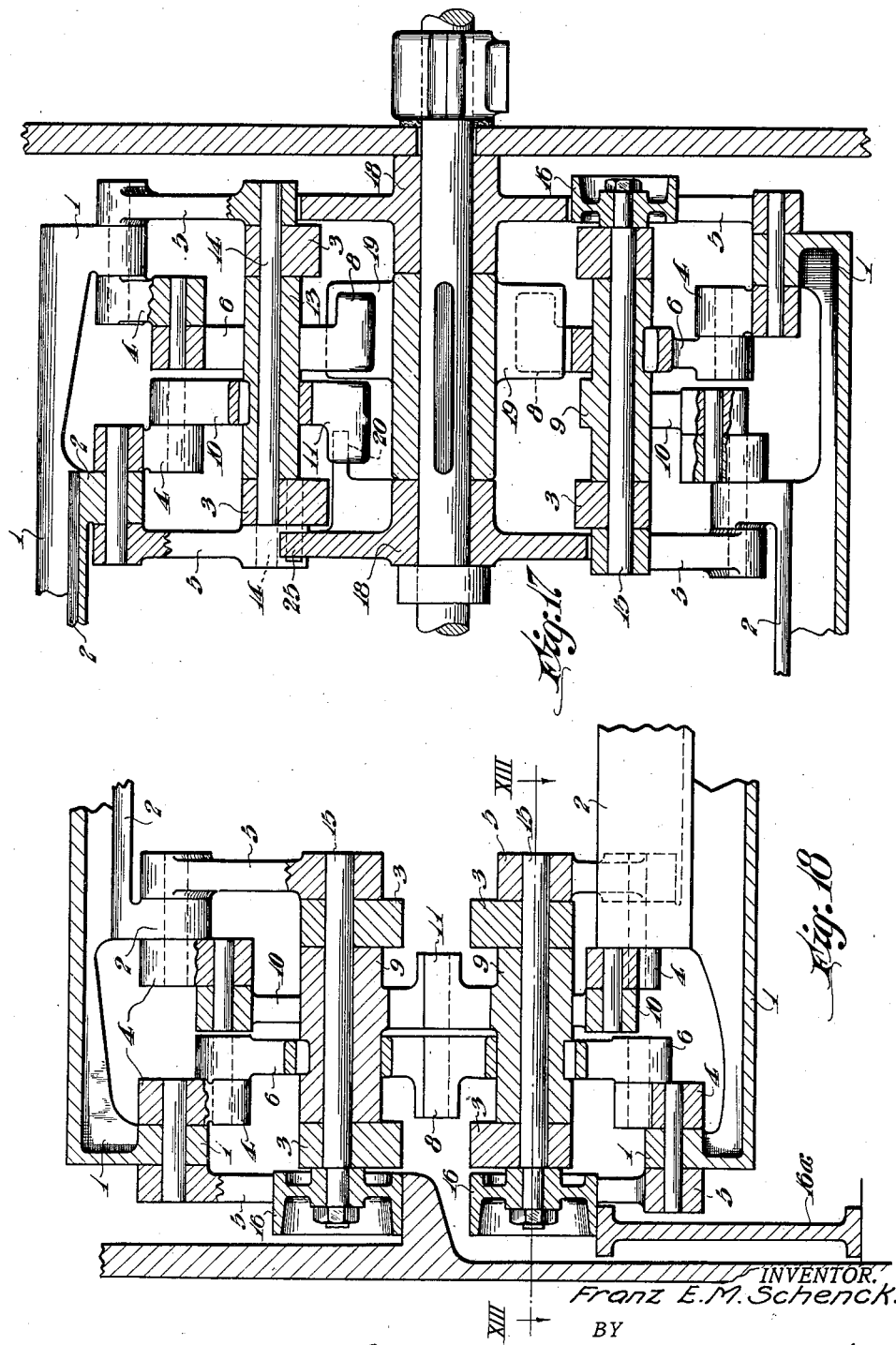

May 7, 1935. F. E. M. SCHENK 2,000,298
TRAVELING CHAIN GRATE
Filed April 2, 1931 7 Sheets-Sheet 6

INVENTOR.
Franz E. M. Schenk
BY
Byrnes, Stebbins, Parmelee & Blenko
ATTORNEYS.

May 7, 1935.  F. E. M. SCHENK  2,000,298
TRAVELING CHAIN GRATE
Filed April 2, 1931   7 Sheets-Sheet 7

INVENTOR.
Franz E. M. Schenk
BY
Byrnes, Stebbins, Parmelee & Blenko
ATTORNEYS.

Patented May 7, 1935

2,000,298

UNITED STATES PATENT OFFICE 2,000,298

TRAVELING CHAIN GRATE

Franz Emil Max Schenk, Altona, Germany, assignor to Frederick W. Buse, Pittsburgh, Pa.

Application April 2, 1931, Serial No. 527,310
In Germany April 12, 1930

16 Claims. (Cl. 110—40)

My invention relates to traveling chain grates for furnaces or boilers. The object of the invention is to effect a differential motion between a chain grate and fuel bed thereon, whereby the grate moves in from the rear of the furnace toward the front of the furnace, and the fuel bed in the opposite direction toward the rear of the furnace. It is a further object that the relative speed of the grate and fuel bed be selective and variable, for the purpose of maintaining a thin, continuous fuel bed, and preventing caking during combustion, agitating the same thoroughly. This agitation also exposes the maximum surface of fuel to the action of the minimum amount of air required for a perfect combustion, at the same time preventing the formation of blow-holes, clinkers and smoke.

It has been observed that grates over which the fuel bed is constantly being moved show an excellent rate of combustion. But such grates, which have been employed heretofore remain constantly within the zone of combustion, so that the fuel adheres to the hot grates. This causes the formation of clinkers and thereby decreases the rate of combustion. Steam jets, which have been used to avoid clinkers, are effective, but uneconomical.

Inclined gravity-feed stokers, and most of the stokers employing a deep fuel bed, avoid this disadvantage by moving the zone of combustion out of the range of the grate. This is especially true with underfeed stokers. But a deep fuel bed demands a large combustion space, and also special arrangements regarding gas passage in order to be economical and to be smoke preventive. Special care also has to be taken in the selection of the fuel best suited for the grate.

The traveling chain grate with its thin fuel bed offers less grate resistance and operates with less smoke than a grate with a deep fuel bed. Since its grate bars remain in the fire zone at intervals only, the traveling grate causes less clinkering than a stationary grate, the bars of which remain permanently in the fire zone. The success of this type of grate is dependent, to a large degree, on the grade of coal and its volatile contents, and on the manner in which the air ducts are arranged.

Generally speaking, it can be said that the traveling chain grate stands for economy and smoke prevention, whereas the deep-fuel-bed grate is adapted for high capacity and varying loads. For internally-fired boilers, both systems are more or less unsuited.

In the known type of traveling chain grate, the fuel rests motionless on the grate, has the same speed as the grate, and moves in the same direction. There is no relative motion between fuel and grate whatever. Unless special precautions are used, such as increased grate speed, there is danger that the ash will fuse. To avoid the latter, various means have been developed to break the fuel bed up at certain intervals. These devices have no other functions. Relative movement between fuel and grate for the purpose of conveying the fuel over the grate to the rear of the furnace has not been known heretofore.

In the case of underfeed stokers, the grate bars are stationary and the fuel is pushed over the grate. In this case we are dealing with a relative grate speed. But this grate speed is determined by the rate of combustion; therefore, it cannot be changed at will. This construction does not allow the use of a thin fuel bed, and in case of an increased fuel speed, much of the fuel leaves the grate unburnt. For this reason, the use of underfeed stokers is confined to certain fuels only, but, using the proper fuel, it meets with great success.

I have invented a new method and apparatus for burning fuel which combines the advantages of the two systems of traveling chain grate and underfeed stoker. I am thus able to select and operate a grate with the relative speed necessary for an economical combustion of fuel of any kind on one and the same grate.

My invention contemplates a traveling chain grate, on which the grate bars are not directly connected to the endless traveling chain, but indirectly by means of links in such a manner that the grate bars are permitted to perform certain motions relative to the endless chain. The motions made by the grate bars take place in a plane substantially parallel to the plane through which the endless chain is traveling; they are reciprocating and therefore positive or negative movements in relation to the endless chain.

The grate bars are arranged in squamoid formation, and are moved alternately against each other, the endless chain traveling at the same time at a uniform speed through the combustion chamber. The direction of the travel of the endless chain is not from the front of the furnace toward the rear of same, but my chain travels in the opposite direction, or from the rear of the furnace to the front or toward the fuel bin. While the chain is moving toward the front, the grate bars are moved with short strokes back and forth, every other bar pushing toward the rear, and the interposed bars pulling toward the fuel bin, and vice-versa, and in such a fashion that the effective push of the grate bars toward the rear of the furnace is somewhat greater than the travel of the chain toward the fuel bin. This difference of travel causes the fuel bed on top of the grate bars to move with the same differential speed from the fuel bin toward the rear. This means the fuel is being pushed over the grate moving in the opposite direction. The fuel, having the tendency to follow the chain in its travel to the front, is constantly being pushed back, passing a large ideal grate surface, which increases with an increase in the number of strokes made by the grate bars and the speed of the endless chain.

The short reciprocating strokes of the grate bars cause a continuous breaking-up of the fuel bed, resulting in an intense agitation of the fuel and a rapid combustion.

The invention contemplates, furthermore, a provision to vary the magnitude of the short strokes of the grate bars. This and a proposed variation of the speed of the endless chain make it possible to establish any speed of the fuel bed from zero to any practical maximum.

The means for operating my traveling chain grate are selective in accordance with the particular application. Underfeed stokers and stokers for furnaces with dutch oven settings are preferably equipped with a special manipulator, such as an actuating chain, or with a cam shaft in a manner similar to the one shown in my copending application Serial No. 386,324 filed August 16, 1929 for Conveyors, or by guide bars, or in any other suitable manner, as will be described hereinafter. In cases where the space is limited, as in Scotch-marine boilers or the like, the reciprocating motion of the grate bars can be brought about by the returning lower flight of the endless chain, in a particular manner, as will be illustrated and described.

The above mentioned means of operation are cited as preferable designs, but it is understood that other operative means may be employed under this invention, for producing the peculiar and characteristic features hereinafter pointed out.

The outstanding feature of my invention is the reciprocating motion of the grate bars in combination with an endless chain moving toward the fuel bin at the front of the furnace or grate, the combined motion of the grate bars and of the endless chain resulting in a differential motion, tending to push the fuel with short strokes from the front of the furnace to the rear of the same over the chain grate, moving in the opposite direction. This results in constantly breaking up the fuel and again condensing it, thereby causing a rapid combustion, preventing the formation of clinkers and avoiding blow-holes in the fire. This movement can be accomplished by various means and it is of secondary importance what means are adopted to achieve this result.

As has been described before, the grate bars are arranged in scale-like fashion. The whole fuel bed is, therefore, divided crosswise into narrow strips. Each one of these strips is pushed toward the rear with strokes of varying length. It can safely be assumed that each fuel particle receives the full amount of stroke and that the narrow fuel strips, arranged closely one in front of the other, unite into a continuous and very lively fuel bed, moving in the opposite direction to the grate chain, in strict accordance with the given push or stroke. This movement proceeds toward the rear with decreasing speed, timed to correspond with the decreasing combustion.

In order that the principle of my invention and the details of its construction may be clearly understood, I will now proceed to describe same with reference to the accompanying drawings and figures of reference marked thereon.

Figure 1 is a partial side elevation of a grate in which the reciprocating motions of the grate bars are caused by the lower flight, certain parts being omitted for clarity;

Figure 1a is a partial, vertical section taken longitudinally of the grate substantially along the line Ia—Ia of Figure 3;

Figure 2 is a plan view of part of the grate in Figure 1;

Figure 3 is a typical section substantially along line III—III of Figure 1a showing part of the grate chain and also the front sprocket;

Figure 4 is a plan view of one of the grate bars;

Figure 4a is a side view of the grate bar;

Figure 4b is a section through a modified form of the grate bar, showing a pocket or pan-like depression for carrying the ash to the front;

Figure 4c is an end view of the grate bar of Fig. 4;

Figure 5 is a plan view of another type of grate bar;

Figure 5a is a side view of the grate bar of Fig. 5;

Figure 5b is an end view of the grate bar of Fig. 5;

Figures 6, 7 and 8 illustrate in three successive positions the movement of the grate bars during one stroke, and also the relative travel of grate, grate bars and fuel;

Figure 14 is an enlarged side elevation of that part of the grate chain forming the straight portion of the lower flight, only one complete set of grate bar operating elements being shown to make clear the relative positions thereof and certain elements being cut away for clarity;

Figure 15 is a section on line XV—XV of Figure 13 showing only a portion of the mechanism of Figure 14 in the same position;

Figure 16 is similar to Figure 14, but part of the chain has been broken away and only the remainder of the apparatus of Figure 14 not shown in Figure 15 is illustrated in the same position it has in Figure 14;

Figure 17 is an enlarged typical section through the front sprocket substantially on line XVII—XVII of Fig. 1a;

Figure 18 is an enlarged typical section through the straight portion of the lower flight of the grate chain substantially on line XVIII—XVIII of Fig. 1;

Figure 9:
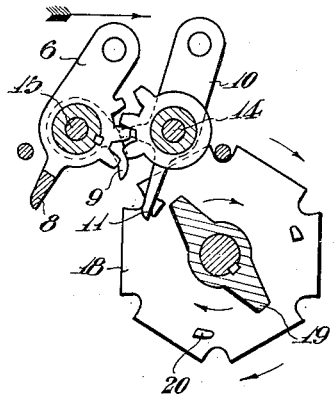
Figures 9, 10 and 11 illustrate in three successive positions the movement of grate bar rockers when passing over the front sprocket of the grate, minor details being omitted, and the sections being taken substantially along line IX—IX of Figure 13.
Figure 10:
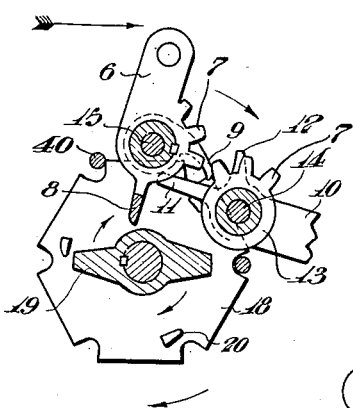
Figure 11:
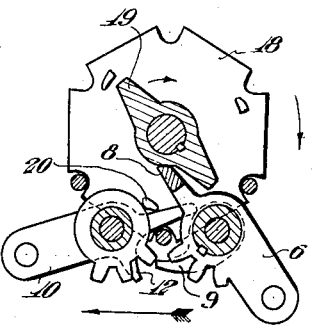

Referring to Figures 1 through 18, these figures illustrate an embodiment of a preferred construction of the grate, the differential motions of the grate bars being effected by the lower return flight of the grate chain, which flight, traveling on rollers 16, is supported by rails 16a and is brought into close contact with the upper flight by arranging the rail 16a at an elevation which makes possible an engagement between the two flights. Reference may be had to Figure 18. 1 and 2 are the grate bars, shown more in detail in Figures 4 and 5, bar 1 having a shape somewhat different from that of bar 2. The pushing edge of all grate bars is shaped in the form of a ram 17, and the bars are arranged in scale-like fashion, bars 1 always alternating with bars 2.

Figure 21:
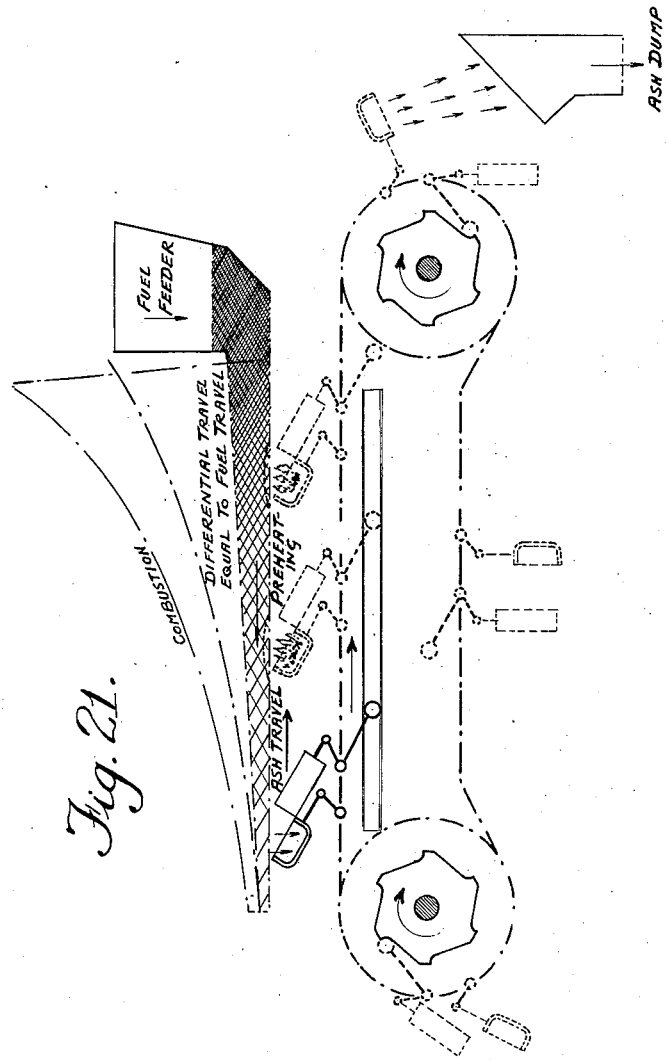
Figure 21 is a diagram of a grate, showing the fuel charge, the progress of combustion and the ash removal to the front.

At the front end of the grate, which is in all illustrations at the right hand side of the figures, a fuel feeder of known construction, shown in Figure 21, is arranged to feed the fuel at a designated rate onto the grate. At the rear of the grate, cover plates of known design may be arranged in the usual manner (not shown) to regulate the emission of the ash, and also to prevent the rising grate bars from being unduly obstructed in their travel by falling ash. The grate bars are supported by a double twin chain 3, guided by rollers 16 mounted on pins 15 (see Figure 18). The links of the chain 3 are provided with additional pin connections 14 and 15 outside of the tension line of the chain, for linking the grate bars thereto.

Figure 13:
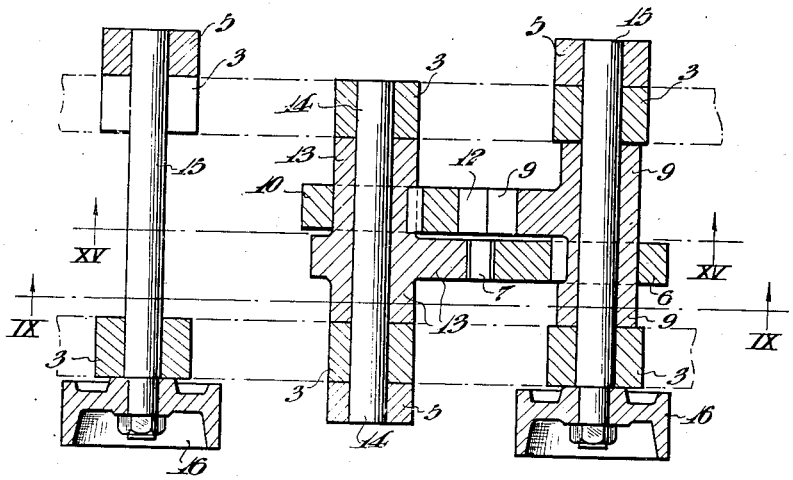
Figure 13 is an enlarged horizontal section through the lower flight of the grate on the line XIII—XIII of Fig. 18.

Link 5 connects grate bar 1 with the outer run of twin chain 3 (see Figures 17 and 18) on the outside thereof. A duplicate link 5 connects grate bar 2 with the inner run of chain 3 on the side toward the center of the chain grate. On the inner side of the outside run, link 4 connects bar 1 with rocker 6, the latter having a fulcrum in pin 15 of chain 3. On the inner side of the inside run of chain 3, a duplicate link 4 connects bar 2 with rocker 10, having a fulcrum in pin 14. Rocker 6 is equipped with teeth 7 (see Fig. 16) and a dog 8, having keyed to it pawl 9. Rocker 10 is equipped with dog 11 and cam 12, and is keyed to hub 13, which is provided with teeth 7. Reference may be had to Figures 13 and 15. The teeth 7 are in mesh, and likewise pawl 9 and cam 12 are arranged opposite each other. The movement of the rockers 6 and 10 is being caused by the dogs 8 and 11. Through action of the above described linkage and teeth, grate bars 1 and 2 are moved against each other in such a way that the one moves ahead when the other one retracts, and vice-versa, as will now be described in detail.

The movement of the rockers is effected by dogs 8 and 11 in the manner illustrated in Figures 6, 7 and 8. When dog 11 of the lower flight (shown in dotted lines in Figure 6) meets dog 11 of the upper flight, it swings the rocker 10 about fulcrum 14, thereby moving grate bar 2 toward the front. At the same time teeth 7 cause rocker 6 to swing in the opposite direction, moving grate bar 1 toward the rear, illustrated by Figures 7 and 8. When dog 11 reaches its extreme position, the upper and lower dogs 8 make contact (the latter being shown in dot-dash lines in Figure 8) and grate bars 1 and 2 are moved in the opposite directions. The dogs 8 and 11 are shown in engagement, in side elevation, in Figure 18. In Figure 6, the fuel on top of bar 1 has been pushed off and bar 2 has received its fuel layer, which is being pushed off partly in Figure 7 and fully in Figure 8. Above Figures 7 and 8 are shown legends indicating the relative movements of grate, bar and fuel.

Figure 12:
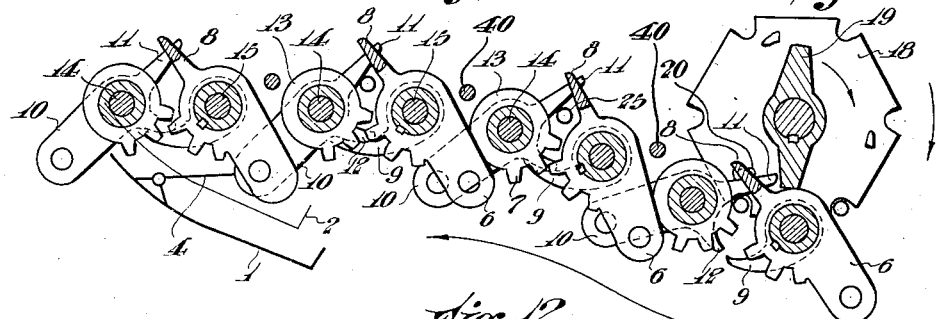
Figure 12 is a continuation of Figure 11 and illustrates the movement of the lower flight when leaving the front sprocket, and shows how the locking of certain parts is accomplished, minor details being omitted.

In order to accomplish the above described movements, it is necessary that the dogs 8 and 11 of the lower flight be locked in their position relative to the lower flight of the chain during the time of their contact with the dogs of the upper flight. Figures 9, 10, 11, 12, 14, 15 and 16 illustrate how this locking is accomplished. As has been mentioned before, the fulcrums 14 and 15 for rockers 10 and 6, respectively, are arranged outside of the tension line of chain 3. When chain 3 winds around the front sprocket 18, in the position illustrated in Figure 10, teeth 7 are disengaged. Located between the two halves of the front sprocket 18 for twin chain 3, there are two swing-arms 19, as can be seen in Figure 17. These arms are keyed to the shaft on which the sprocket wheels 18 are mounted loosely, and the shaft receives its rotation from the same drive which moves the grate chain, the latter being driven from the rear sprocket shaft. Both motions are caused by known means, such as a motor and gear reductions or the like, and in such a manner that the sprockets as well as the swing-arms rotate in the same direction. The swing-arms are driven at a greater angular velocity than the sprocket wheels, and therefore overtake one of the dogs 8 and press it down to such an extent that rocker 6 is swung about to make possible an engagement of pawl 9, rigidly connected to rocker 6, with cam 12, forming part of rocker 10. Reference may be had to Figure 12.

Rockers 6 and 10, the latter being held for a while in its position by boss 20 on sprocket wheel 18 (Figures 12 and 17), leave sprocket 18, and due to the straightening of the chain 3 and the action of the weight of the grate bars, pawl 9 and cam 12 approach each other and finally come into a locking position, as can be seen from Figure 12. Thus they remain locked during the travel over the straight portion of the lower flight. A clear understanding of the forces which keep the rockers 6 and 10 with fingers 8 and 11 in their position while actuating the respective fingers of the upper flight can be gotten from Figures 14, 15 and 16, which for the sake of clarity show one pair of rockers only. Figure 14 is an assembly of Figures 15 and 16.

While traveling over the straight portion of the lower rail, the grate bars assume a close formation in a telescopic fashion, bar 1 always being below bar 2. In Figure 14 the bars indicated by dot-and-dash lines belong to the neighboring rockers. Figure 15 singles out rocker 10 with links and grate bar 2 to show clearly that a force on finger 11, caused by finger 11 of the upper flight while moving to the right (or front of the grate), is exerted to tend to turn rocker 10 in a clockwise direction. Such a motion is counteracted by the weight of the grate bar 2 and connecting links, tending to turn rocker 10 in a counter-clockwise direction. Besides this, a positive limit to clockwise rotation of rocker 10 is reached when grate bar 2 butts against chain 3 at the point marked A. Figure 16 illustrates that a clockwise rotation of rocker 6, due to a force in direction of the arrow, resulting from actuating the finger 8 of the upper flight, is aided by the weight of grate bar 1 and connecting links. A definite stop limits such movement when the tip of pawl 9 comes to rest in the neck of cam 12 at point B. The curvature of the interlinking part of pawl 9 and cam 12 is such that its continuation approximately passes through fulcrum 14. The weight of the grate bars and connecting links thus keeps the pair of rockers in their respective positions, until they reach the descending part of rail 16a. It is, of course, understood that slight clearances have to be maintained at points A and B to safeguard against breakages. When the pair of rockers approaches the rear sprocket 21, the procedure described above repeats in a reversed order. Pawl 9 and cam 12 are disengaging, the rocker 6, now free, is being pushed upward by the weight of the descending grate bar, its dog 8 making contact with projection 22 of sprocket 21 (Figure 1). Held between projection 22 and a similar projection 23 on sprocket 21, dog 8, is kept back until rocker 6 leaves sprocket 21. The shape and the position of projections 22 and 23 is such that rocker 6, when leaving the sprocket, is in its normal position in respect to rocker 10 for operation during the travel over the upper flight. See Figures 6, 7 and 8.

The magnitude of the pushing motions, as has been pointed out before, depends on the time during which the dogs on the upper flight and the lower flight are in contact with each other, and on the ratio between the levers, represented by rocker and dog. In the embodiment using the actuating chain, (Figure 19) the number and the magnitude of the pushes of the grate bar can be varied independently of the grate chain travel. This is not possible in the above-described construction, for chain travel and grate bar push are in close relation, and the number of pushes is constant for a given speed of the chain.

Figure 19:
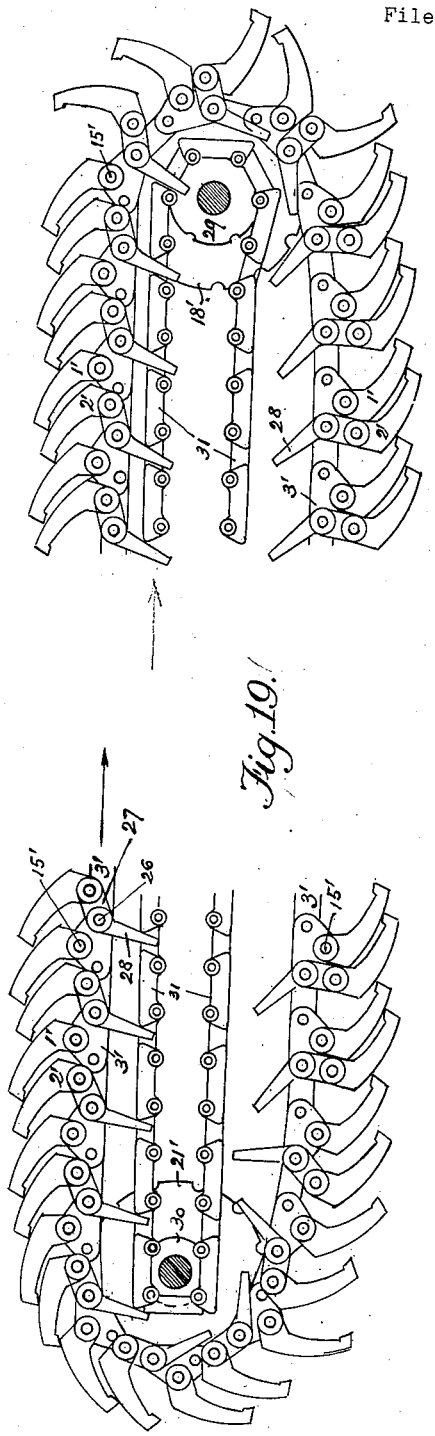
Figure 19 is a typical side elevation of a traveling chain grate, equipped with an actuating chain for actuating the grate bars.

Figure 19 illustrates an embodiment of a preferred construction of the grate, equipped with an auxiliary actuating chain. The grate bars 1' and 2' are also connected to a chain 3', traveling in the direction toward the front of the furnace over a front sprocket 18' and a rear sprocket 21', guided between sprockets in the known manner by rollers. Grate bars 1' are directly connected to the chain in a known manner by pins 15', whereas bars 2' are joined to the chain by rockers 27 with fingers 28, having their fulcrums at chain pins 26. Bars 1' and 2' alternate and chain 3' is of a known design, being driven at a uniform speed in the known manner. Auxiliary front and rear sprockets 29 and 30 serve to guide the actuating chain 31. This chain, which may be located at either side or between the grate chains, is driven either by the grate chain drive or by an independent drive of known construction, but at certain regular intervals only. The intermittent movement of the actuating chain and the uniform movement of the grate chain will cause certain step-like motions between the two chains and, consequently, between the grate bars 1' and 2'. As can be clearly seen in Figure 19, the fingers 28 are engaged between the specially formed links of chain 31. When grate chain 3' moves with a certain uniform speed toward the right or front of the furnace, and the actuating chain 31 travels (at intervals) with a greater speed also toward the right, the fingers 28 on rockers 27 will swing with a counter-clockwise motion about fulcrums 26, and consequently grate bars 2' will be pushed to the left, pushing the fuel on top of grate bars 1' toward the rear of the furnace. In the intervals when the actuating chain does not move, grate chain 3' in moving to the right causes fingers 28 to swing with a clock-wise motion about fulcrums 26, forcing grate bars 2' to move to the right, allowing the fuel on top of it to be pushed off and to the left by grate bars 1'. The rear sprocket 30 has less teeth than the front sprocket 29, in the present embodiment, four teeth against six of the front sprocket, giving chain 31 an inclination to the grate chain toward the rear, resulting in an increase of the effective length of leverage of fingers 28. By gradually lengthening the effective length of the lever of fingers 28 toward the rear, the angular motion of the fingers 28 decreases toward the rear and the relative movement of the grate bars is reduced in the same ratio. Since the actuating chain 31 has the same pitch as the grate chain 3', but fewer links, due to this fact and by giving the sprockets the proper form and projections or the like, fingers 28 will pass over the sprockets without difficulty. Reciprocating movement of alternate bars is effected intermittently by the movement of the actuating chain.

Figure 20:
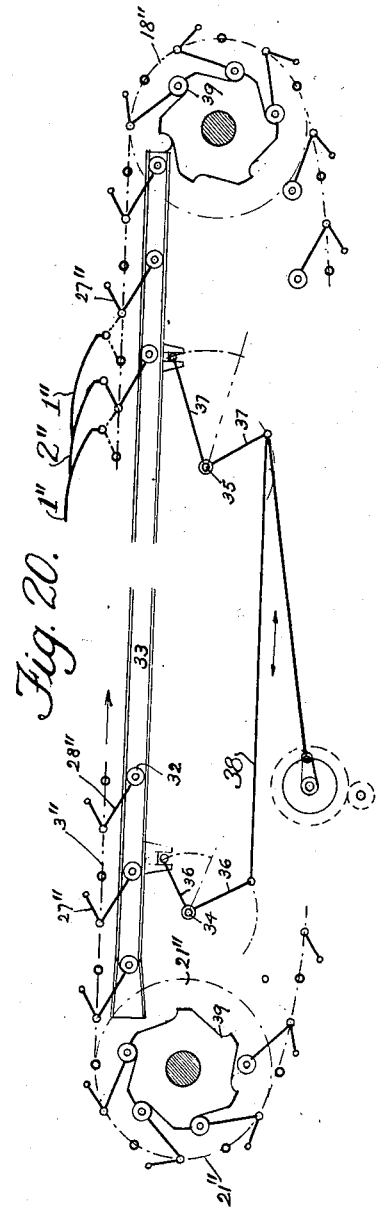
Figure 20 shows diagrammatically a grate, equipped with a swing-beam, instead of an actuating chain, for actuating the grate bars.

Whereas the chain grate in Figure 19 is equipped with an actuating chain to cause the relative motion between grate bars, the embodiment in Figure 20 accomplishes this by means of a swing-beam 33. Chain 3'' is moving as before in a direction toward the front of the grate, and the grate bars 1'' and 2'' are linked to the chain 3'' in a manner similar to the one shown previously. Fingers 28'' are disposed at an acute angle to rocker 27'' and are equipped with rollers 32, engaging with a swing-beam 33. The latter is a channel or the like. Sprockets 18'' and 21'', rotating with uniform motion, carry socket-like projections 39 for the rollers 32, thereby guiding the fingers 28'' over the sprockets. Swing-beam 33 is supported by two-arm levers 36 and 37, having their fulcrums in bearings 34 and 35, respectively. Levers 36 and 37 are connected by a rod 38 to a crank drive or the like, moving the rod up and down with the required or desired speed. By providing adjustability in the length of the crank and levers, any amount of relative movement between grate bars and grate chain can be accomplished. It will be noticed that the upper leg of lever 37 is somewhat longer than the corresponding leg of lever 36, by which means the swing-beam 33 is given a larger up and down movement in the front part, decreasing toward the rear, resulting in a gradually decreasing relative movement between grate chain and grate bars toward the rear.

Figure 21 shows diagrammatically how the fuel is charged on the grate and the course of combustion. It also indicates the manner in which the ash can be carried toward the front of the furnace by means of dished grate bars which may have the form illustrated by Figure 4b. In order to explain this movement generally, it will be assumed for the present that the motion is uniform.

Assuming the grate moves in a certain time T through a certain distance B to the front of the furnace and, at the same time, a certain grate bar makes a stroke A equal or larger than 2B, also toward the front of the furnace, then the fuel on top of this bar is scraped off by the blunt-nosed grate bar above onto the grate bar below. So far, the fuel has not received any movement in the horizontal direction relative to the chain grate, but it has been disturbed a great deal and has been moved about, with the result that new surfaces of it are being brought into contact with the air. During the travel of the grate through the next distance B, the grate bar under consideration is pushing back with the stroke A to its old position, i. e., toward the rear of the furnace, taking with it the fuel, which is depositing on its top surface over the whole width of the grate. In the foregoing cycle, the chain grate traveled a distance 2B, whereas the grate bar has traveled the distance A in the opposite direction. The travel C of the fuel is therefore $$C = A - 2B$$

Still assuming a uniform motion, the grate bar under consideration, for a given length D of the chain grate would have to make $$N = D/C$$

pushes, (N indicating the number of pushes or strokes) to move the fuel over the real length D of the grate.

This means that the fuel strip in question is travelling over an ideal grate length E, determined by the equation $$E = N \times A$$

This length, which is identical with the relative grate travel, will always be larger than the real grate length D.

As has been explained in the foregoing, the relative grate travel E depends on the magnitude of the throw A of the pushing grate bar, and on the number N of the pushes. This means that for a given relative grate travel, the number and the magnitude of the pushes can be varied, or the relative grate travel can be varied by varying the two other factors of the equation, the selection depending on the amount of agitation the fuel needs and on the rate of combustion demanded.

The real grate length D is proportional to the ideal grate length (or relative grate length) E, as the fuel speed V is proportional to the relative grate speed W. The latter may be expressed by $$W = \frac{V \times E}{D}$$

At this point, the value and the effect of the agitation or turnover of the fuel may be dealt with. The capacity of the fuel for ignition is determined by the gaseous contents of the fuel and the ratio between exposed surface and mass. The larger this ratio, the larger is the capacity to absorb the heat necessary for ignition. At the same time the speed of reaction is increasing. The capacity of the surface for reaction can strongly be decreased by dense packing of the fuel. Here is where the agitation of the fuel sets in, having been attempted and accomplished with more or less success by all movable grates.

The grate in the present invention is an improvement over the known constructions in that it agitates the fuel to the extent demanded by the characteristics of the fuel, but without changing the fuel speed. Ready absorption of heat by the fuel has still another effect, viz., the coking of the coal. With a thick layer of fuel and slow grate speed, coal inclined to coking is rapidly heated, the coal being transformed into a plastic mass, finally baking together into more or less large cakes, making an economical combustion impossible. Most difficulties in the operation of mechanical stokers and the destruction of grate bars are to be traced back to this source. This danger can be avoided by increasing the grate speed. As has been pointed out before the present grate affords a wide variation of grate speed without changing the absolute fuel speed, which has to be considered as an advantage over the known constructions.

This advantage receives an added value from the counter motion of grate and fuel. The cold grate enters the fire bed at its rear end, where it is hottest, traveling to the front immediately underneath the fuel bed which is pushed over it. The grate extracts enough heat from the hot ash to make a fusion of the latter impossible. The heat in turn is transmitted by the grate to the green fuel, thereby facilitating ignition. Therefore the present grate acts as a temperature-equalizer, avoiding dangerously high temperatures at the rear of the furnace, and transmitting the heat to the front of the furnace to serve a useful purpose.

The temperature-maximum, which develops in the fuel bed, is influenced by the grate speed or relative grate speed, or, expressed in other words, by the ratio of fuel surface to mass of fuel. The larger the surface, the lower the maximum temperature. The manner in which a large ratio can be accomplished by the present grate has been explained before. With a coal layer of infinite thickness and with an infinitely large grate speed, the maxmium temperature would be identical with the surface temperature of the fuel bed, which would eliminate entirely the danger of coking. This knowledge leads to the desire to approach the ideal condition by increasing the relative grate speed to the practical maximum. An ordinary traveling chain grate can, of course, only approach this ideal condition for the reasons pointed out before, especially to avoid blowing holes in the fire, which led to the zoning of the air supply.

In the past it has been proposed to decrease the speed of the fuel bed toward the rear of the furnace for the purpose of increasing the density of the bed. But in all these attempts, the decrease in speed is immediately being followed by immobility of the fuel or ash, which condition increases the danger of grate destruction. Since these constructions did not solve the problem satisfactorily, their application has been confined to a few cases only. The present invention allows a gradual increase in the density of the fuel bed to the very end of it, and to the degree demanded by the nature and composition of the fuel.

As has been described elsewhere in this application, the travel or feed of the fuel toward the rear of the furnace is not uniform (as has been assumed in the foregoing explanation of the principle), but it decreases toward the rear in proportion to the rate of combustion, or less, if an increased density of the fuel or ash bed toward the rear is desirable. The movement of the grate consists of two motions, the travel of the chain grate toward the front and the push motion of the grate bars to the rear. The differential between the two motions causes the movement of the fuel bed, which can be zero when the two motions are made alike. But even in the latter case, the relative movement between grate and grate bars still exists. When the pushing speed of the grate bar, instead of being uniform, is gradually decreased toward the rear, it is evident that the time needed for a certain stroke will be longer, and it is also evident that this differential in time or speed will cause an increase in the density of the fuel. Furthermore, when the pushing stroke of the grate bar is decreased toward the rear and in turn the number of pushing strokes is increased, it is clear that the relative grate speed, which has been assumed in the foregoing instance, not only can be maintained, but that at the same time a decided turnover and agitation of the fuel and ash takes place. Therefore, the present invention accomplishes an exceedingly lively agitation and at the same time a packing of the fuel bed over the whole length and width of the grate, and with any desired degree of relative grate speed. This eliminates the danger of burnng holes through the fuel bed.

It remains now to point out the advantages derived from the gradually increasing heat stored up in the grate bar when coming up cold from the rear. It has been said before that the counter-current movement of grate and fuel tends to equalize the temperature between front and rear of grate. But this compensation can be enhanced considerably by using the grate bar to convey the hot ash underneath the fuel bed to the front. The relative movement between grate and grate bar is small at the rear and can be made zero when so desired. It has been demonstrated that in spite of this, the agitation of the burnt fuel is quite lively, and that the oncoming cold grate bars have a tendency to cool the ash. Therefore, in cases where such a procedure is desirable or imperative, as in case of internally-fired boilers or the like, where lack of space makes the removal of ash a problem, the ash, which is more or less granulated, can be taken to the front of the furnace by especially dished grates placed at certain intervals on the chain. In this manner, the heat stored up in the ash will partly be transmitted to the green fuel. Thus, the latter will be made more reactive and at the same time the ash upon arrival at the front will be considerably cooled off. With its ready application to internally-fired boilers, the present grate can be used almost universally to advantage.

Summing up the advantages of this invention over the known art, it may be said:

The fuel in narrow strips of the width of the grate is pushed by short strokes over the grate, moving in the opposite direction. The speed of the grate, which equals the relative grate speed, can be made a multiple of the speed of ordinary traveling chain grates on account of the counter motion principle, and without increasing the absolute fuel speed, the latter being demanded by the nature of the fuel or the grate capacity. Thus by turning over and shifting of the fuel every so often as desired or necessary, the highest ratio between surface exposure and mass of fuel can be obained for economical combustion, and the maximum temperature in the fuel bed can be reduced to avoid coking. Besides, this grate makes it possible to use a relative grate speed, necessary for a given fuel for a complete combustion, without changing the absolute fuel speed, demanded by a given grate performance, i. e., without changing the amount of fuel for a given grate area.

The fuel speed, necessary for an efficient combustion, is gradually decreased without detriment to the relative grate speed needed, with the result that the fuel can be burnt on the grate in the thinnest layer practical, at the same time reducing the maximum temperature in the fuel bed. The fuel in the rear, being dammed-up and increased in density, is given an opportunity to burn out the rest of the combustibles. A special device for stowing or packing of the ash is not necessary. The air supply can be uniform over the whole grate, due to a uniform thickness of the fuel bed and the absence of holes in the fire. The grate can be operated with a lower air pressure, resulting in a reduction of cinder dusting.

The grate, in accordance with this application, using the counter-current principle, has the further advantage that the grate bars, entering cold in the rear on their way to the front, transmit heat from the consumed or partly consumed fuel to the green fuel. The ash can be conveyed by the grate underneath the fuel bed to the front, and by these means the grate can be employed on internally-fired boilers or the like, where ash removal from under the grate is difficult.

While I have illustrated and described the present preferred embodiment of my invention, it is to be understood that it is not to be limited thereby but may be otherwise embodied within the scope of the following claims.

I claim:

1. A traveling chain grate having a grate chain, an actuating chain, grate bars pivoted in rows on the grate chain, and means on alternate rows cooperating with the actuating chain, for reciprocating said alternate rows while they are carried on the upper run of said grate chain.

2. A traveling chain grate having a grate chain, grate bars pivoted on the grate chain, means for oscillating said bars on the upper run of the grate chain, and means for locking said bars against oscillation while traversing the lower run of the grate chain.

3. The combination with a chain grate having a grate chain, of a plurality of grate bars pivoted thereto for oscillatory movement, and means for oscillating said bars at intervals while traversing the upper run of the chain to effect a step-by-step movement of fuel on the bars in the upper run in a direction opposite to the movement of the upper run of the chain.

4. A grate chain having an upper run moving toward the front of the furnace and a lower run moving in a reverse direction, grate bars carried on said chain and movable relative thereto, and means for moving said bars while traversing the upper run of the chain to shift fuel thereacross in opposition to the movement of the chain in the upper run.

5. A grate chain having an upper run moving toward the front of the furnace and a lower run moving in a reverse direction, grate bars carried on said chain and movable relative thereto, and means for moving said bars while traversing the upper run to shift fuel thereacross in opposition to the movement of the upper run of the chain, comprising projections extending upwardly from the lower run of the chain.

6. In a furnace, a grate including a chain and a plurality of rows of overlapping grate bars arranged in squamoid fashion and pivoted to the chain for reciprocation substantially in the plane of the grate surface, means for driving the grate chain, and means for reciprocating said bars while traversing the upper run of the chain to push fuel on the grate intermittently toward the rear of the furnace, while movement of said chain carries the fuel in the opposite direction.

7. A traveling chain grate in accordance with claim 6, having means for varying the extent of the reciprocation of said grate bars along the length of the grate.

8. A traveling chain grate in accordance with claim 6 wherein the means for reciprocating the grate bars include interlocked levers on the lower flight of the grate chain.

9. A traveling chain grate in accordance with claim 6, the grate bars being provided with pockets serving as ash buckets for receiving ash from the grate when travelling on its upper run and delivering it at the front of the furnace.

10. In a furnace stoker mechanism, the combination with a chain grate including grate bars, and means for moving the upper run of the grate toward the front of the furnace, of means pivotally supporting the grate bars, and means for causing reciprocating movement of the bars while traversing the upper run to effect the feeding of fuel across the grate from the front to the back thereof.

11. In a traveling chain grate, a chain traversing spaced sprockets, a plurality of grate bars mounted on said chain to provide a fuel-bearing surface, and means for intermittently reciprocating the bars forming said surface to impart an intermittent step-by-step movement to fuel on the bars, in a direction opposite that of the movement of the chain supporting said surface.

12. A traveling chain grate in accordance with claim 11, having means for varying the extent of step-by-step movement of fuel on the grate bars, along the lngth of the grate.

13. A traveling chain grate in accordance with claim 11 wherein the grate bars are provided with pockets serving as ash buckets, for receiving ash from the grate when traveling on the upper run of the chain and delivering ash at the front of the furnace.

14. In a method of burning fuel wherein a bed of fuel is conveyed away from the fuel supply accompanied by agitation of the fuel and air for combustion is supplied to the bed, the steps consisting in imparting general movement to the bed of fuel in the direction of the fuel supply, and intermittently moving portions of the bed sufficiently in the opposite direction so that the resultant feed of the bed of fuel is away from the fuel supply.

15. In a method of combustion the steps consisting of delivering fuel in a relatively thin layer to form a bed of fuel for combustion, moving the bed of fuel toward the point of delivery of the fuel, and imparting step by step movement to portions of the fuel bed in the opposite direction, the successive portions along the bed being alternately moved, and the extent of such step by step movement exceeding the movement toward the point of delivery of the fuel so that the resultant travel of the bed of fuel is away from the point of delivery of the fuel.

16. In a method of combustion the steps consisting of delivering fuel to form a bed for combustion, supplying air for the combustion of the fuel, moving the bed of fuel in general toward the point of fuel delivery, agitating the bed by intermittently pushing portions of the fuel away from said point and so relating the extent of the pushes to the general movement of the bed as to impart a resultant travel to the fuel bed as a whole in a direction away from said point.

FRANZ EMIL MAX SCHENK.